(12) United States Patent
Ausserlechner

(10) Patent No.: US 11,410,808 B2
(45) Date of Patent: Aug. 9, 2022

(54) ROTARY ENCODER WITH SHIELDED MAGNET

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/130,222

(22) Filed: Dec. 22, 2020

(65) Prior Publication Data

US 2021/0110954 A1 Apr. 15, 2021

Related U.S. Application Data

(62) Division of application No. 15/874,275, filed on Jan. 18, 2018, now Pat. No. 10,950,377, which is a division of application No. 14/604,855, filed on Jan. 26, 2015, now Pat. No. 9,892,836.

(51) Int. Cl.
*G01P 3/487* (2006.01)
*H01F 7/02* (2006.01)

(52) U.S. Cl.
CPC ............ *H01F 7/0205* (2013.01); *G01P 3/487* (2013.01)

(58) Field of Classification Search
CPC ....... G01P 3/487; H01F 7/0242; H01F 7/0268
See application file for complete search history.

(56) References Cited

U.S. PATENT DOCUMENTS

| 2,947,563 A | 8/1960 | Stitt |
| 3,041,697 A | 7/1962 | Frances |
| 3,205,415 A | 9/1965 | Takeo et al. |
| 4,379,598 A | 4/1983 | Goldowsky |
| 5,789,917 A | 8/1998 | Oudet et al. |
| 6,356,073 B1 | 3/2002 | Hamaoka et al. |
| 8,552,714 B2 | 10/2013 | Matsushima |
| 8,829,894 B2 | 9/2014 | Banerjee |
| 2005/0068024 A1 | 3/2005 | Byram |
| 2008/0164867 A1 | 7/2008 | Steinich et al. |

FOREIGN PATENT DOCUMENTS

| DE | 2001368 A1 | 7/1971 |
| DE | 102006020700 A1 | 11/2007 |
| WO | 03019103 A2 | 3/2003 |

OTHER PUBLICATIONS

Ausserlechner, Udo. "A Theory of Magnetic Angle Sensors With Hall Plates and Without Fluxguides." Progress in Electromagnetics Research B, vol. 49, 77-106, Feb. 2013.
(Continued)

*Primary Examiner* — Ramon M Barrera
(74) *Attorney, Agent, or Firm* — Eschweiler & Potashnik, LLC

(57) ABSTRACT

A magnetic set-up for use in a rotary encoder is disclosed. The set-up includes a permanent magnet arrangement including at least one permanent magnet, which is rotatable with respect to a rotation axis, and a soft magnetic sleeve encompassing the rotation axis and thus the permanent magnet arrangement for shielding against external magnetic fields. The at least one permanent magnet includes a through-hole, which extends along the rotation axis, so that the permanent magnet fully extends around the rotation axis.

14 Claims, 5 Drawing Sheets

(56) References Cited

OTHER PUBLICATIONS

Ausserlechner, Udo. "Inaccuracies of Giant Magneto-Resistive Angle Sensors Due to Assembly Tolerances." IEEE Transactions on Magnetics, vol. 45, No. 5, May 2009.
Ausserlechner, Udo. "The Optimum Layout for Giant Magneto-Resistive Angle Sensors." IEEE Sensors Journal, vol. 10, No. 10, Oct. 2010.
Ausserlechner, Udo. "Inaccuracies of Anisotropic Magneto-Resistance Angle Sensors Due to Assembly Tolerances " Progress in Electromagnetics Research B, vol. 40, 79-99, Apr. 2012.
Notice of Allowance dated Oct. 5, 2017 for U.S. Appl. No. 14/604,855.
Non-Final Office Action dated Jun. 29, 2017 for U.S. Appl. No. 14/604,855.
Final Office Action dated Mar. 17, 2017 for U.S. Appl. No. 14/604,855.
Non-Final Office Action dated Jul. 28, 2016 for U.S. Appl. No. 14/604,855.
Siemens, datasheet for Hall sensor KSY14, no date.
Non-Final Office Action dated Mar. 4, 2020 for U.S. Appl. No. 15/874,275.
Final Office Action dated Jul. 16, 2020 for U.S. Appl. No. 15/874,275.

ROTARY ENCODER WITH SHIELDED MAGNET

REFERENCE TO RELATED APPLICATION

This application is a is a divisional of U.S. application Ser. No. 15/604,855 filed Jan. 18, 2018, which is a divisional of U.S. application Ser. No. 14/604,855 filed on Jan. 26, 2015, patented as U.S. Pat. No. 9,892,836, on Feb. 18, 2018, the contents of which are incorporated by reference in their entirety.

FIELD

The present disclosure generally relates to the field of rotary encoders using magnetic field sensors for detecting the angular position or velocity of a rotating shaft.

BACKGROUND

For operation in harsh environments, it is good practice to use angle sensors based on magnetic principles. They cover a large temperature range from 50 degrees to 170 degrees Celsius, show practically no wear, and are robust against many kinds of contaminations. Automotive applications reach from small angular excursions of a few (angular) degrees (as used, e.g., in torque measurement) to medium angular excursions of 30 to 120 degrees (as used, e.g., in head-light levelling or throttle valve positioning) to complete 360 degree detection in motor position sensing and even to multi-turn detection for steering wheels. Particularly for angle ranges exceeding 180 degrees the most common systems use a small permanent magnet attached to the end surface of the rotating shaft. The magnetization is usually perpendicular to the rotation axis thus giving rise to a magnetic field, which is thus predominantly perpendicular to this axis. A magnetic field sensor is placed in front of the magnet. If the axis rotates the magnetic field also rotates and the rotation can be detected by the magnetic field sensor.

In practical implementations, the magnetic field generated by the permanent magnet used in the rotary encoder can be distorted by undesired external magnetic fields. Without countermeasures such distortion will results in a deteriorated measurement of the angular position or speed of the shaft. Thus, there is a need for rotary encoders which have a reduced sensitivity with regard to external magnetic fields in order to improve the accuracy of the encoder.

SUMMARY

Exemplary embodiments of the present disclosure relate to a magnetic set-up for use in a rotary encoder. In accordance with one example of the present disclosure the set-up comprises a permanent magnet arrangement including at least one permanent magnet, which is rotatable with respect to a rotation axis, and a soft magnetic sleeve encompassing the rotation axis and thus the permanent magnet arrangement for shielding against external magnetic fields. The at least one permanent magnet includes a through-hole, which extends along the rotation axis, so that the permanent magnet fully extends around the rotation axis.

Other exemplary embodiments of the present disclosure relate to a rotary encoder. In accordance with one example of the present disclosure the rotary encoder comprises a permanent magnet arrangement including at least one permanent magnet, which is rotatable with respect to a rotation axis and includes a through-hole, which extends along the rotation axis, so that the permanent magnet fully extends around the rotation axis. A soft magnetic sleeve encompasses the rotation axis and thus the permanent magnet arrangement for shielding against external magnetic fields, and a magnetic field sensor is located within the through-hole on the rotation axis.

BRIEF DESCRIPTION OF THE DRAWINGS

The disclosure can be better understood with reference to the following drawings and descriptions. The components in the figures are not necessarily to scale; in-stead emphasis is placed upon illustrating the principles of the disclosure. More-over, in the figures, like reference numerals designate corresponding parts. In the drawings.

DETAILED DESCRIPTION

Figure 1:
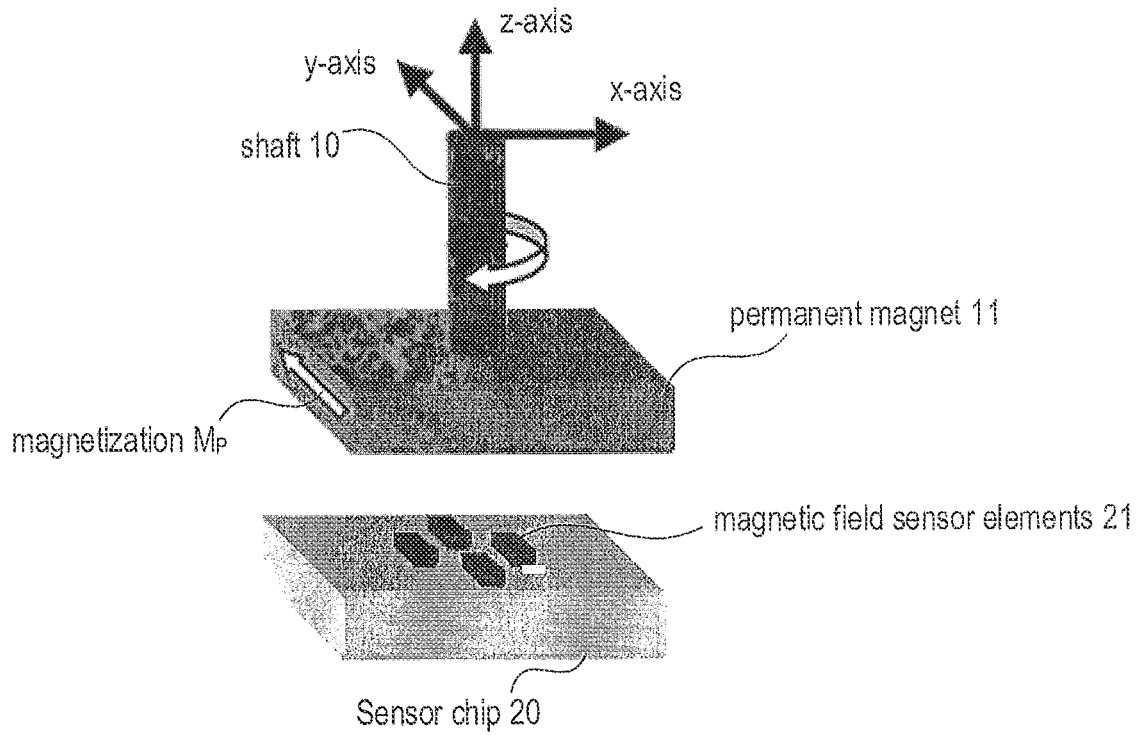
FIG. 1 is a schematic illustration of a rotary encoder including a permanent magnet attached to a rotating shaft and a magnetic field sensor.

Rotary encoders such as the magnetic angle sensor illustrated in FIG. 1 may be used to measure the angular position or speed of a rotating shaft 10. Generally, such rotary encoders include at least one permanent magnet 11, which is attached to the rotating shaft 10, and a magnetic field sensor attached to a stator (not shown in FIG. 1). In the present example, the magnetic field sensor is composed of several sensor elements 21 integrated in a silicon die 20, which is also referred to as magnetic field sensor chip. However, it should be understood that the specific material of the substrate is arbitrary; it may be a different semiconductor material such as e.g. GaAs or it may even by a glass or ceramic substrate which holds the sensor elements. More-over, in some cases it may also be useful to have sensor elements distributed on several substrates, which are, however, arranged in the same sensor package (also referred to as multi-chip package). The magnetic field sensor chip 20 is configured to measure the magnetic field (in particular its orientation) of the permanent magnet 11, which rotates with the shaft 10. In particular, the sensor elements 21 may be Hall effect sensor elements (Hall plates), MAG-FETs or magneto-resistive (MR) sensor elements (thin film sensor elements). The magnetic field "seen" by the sensor chip 20 mainly depends on the remanent magnetization of permanent magnet 11 and disturbing external magnetic fields.

For the further discussion, a Cartesian coordinate system is used wherein, without loss of generality, the z-axis is defined to be the rotation axis of the shaft 10 (and the magnet 11); the x-axis and the y-axis define the plane (i.e. the xy-plane), in which the sensor elements 21 of the magnetic field sensor chip 20 are situated. In other words, the magnetic field sensor chip 20 is configured to measure two orthogonal components $H_x$ and $H_y$ of magnetic field H. That is, the magnetic field H is assumed to be a vector in the xy-plane (H=[$H_x$, $H_y$]); any field component $H_z$ parallel to the rotation axis (z-axis) is considered negligible or constant (i.e. not depending on the angular position of the shaft 10) at the rotation axis, where the sensor chip 20 is located. The angular position φ (with respect to the direction of the x-axis) to be measured may then be determined as follows: tan(φ)=$H_y$/$H_x$. In different set-ups, the magnetic field sensors may be placed distant from the z-axis (rotation axis and measure the field component Hz to obtain information about the angular position of the permanent magnet.

As indicated above, the magnetic field sensor chip measures the magnetic field H present at the position of the sensor chip 20 (i.e. at the spatial coordinates [0, 0, 0]), wherein the effective magnetic field H is a superposition of the magnetic field caused by the permanent magnet 11 and (undesired) external magnetic fields, which distort the desired magnetic field of the permanent magnet 11. To eliminate or at least reduce the effect of disturbing external magnetic fields the sensor chip 20 may be magnetically shielded by placing the sensor in the interior a hollow shaft, which is made of a ferromagnetic material and therefore acts as a shield against external magnetic fields. In the exemplary embodiment of FIG. 2, the hollow shaft has the shape similar to a tube or a cylindrical sleeve. That is, the hollow shaft 10' has a cylindrical hole that extends along the rotation axis and forms a cavity in the interior of the hollow shaft 10'. However, the hole does not necessarily extend through the whole shaft. To provide a sufficient shielding the ferromagnetic material may have a relative magnetic permeability of, e.g., 500 or higher. To avoid confusion between rotation shaft 10 and hollow shaft 10' the term sleeve is used in the further discussion to denote the hollow shaft. The sleeve 10' may be an integral part of the rotating shaft 10 (see FIG. 1) or mechanically attached thereto. In the first case, the sleeve 10' may be formed, e.g., by drilling a hole into the front of the shaft 10 along the rotation axis of the shaft 10. In the second case, the sleeve 10' may be fixed to the shaft 10, for example using a press-fit or a screw thread. Furthermore, the sleeve 10' may be glued to the shaft 10.

The sleeve 10' (as well as the hole in it) is axially symmetric with regard to the rotation axis (z-axis). Permanent magnet 11, as well as sensor chip 20, are placed on the rotation axis to form an axially symmetric set-up. Otherwise, the sleeve 10' would asymmetrically distort the magnetic field of the permanent magnet 11. As mentioned above, magnet 11 may be attached to shaft 10 so that both can perform a common angular motion. Due to the absence of any relative motion between magnet 11 and shaft 10 eddy currents (and magnetic field components resulting therefrom) are avoided in the shaft. However, in some applications it may be useful to attach the sleeve 10' to the stator and accept the negative effect of eddy currents.

Figure 2:
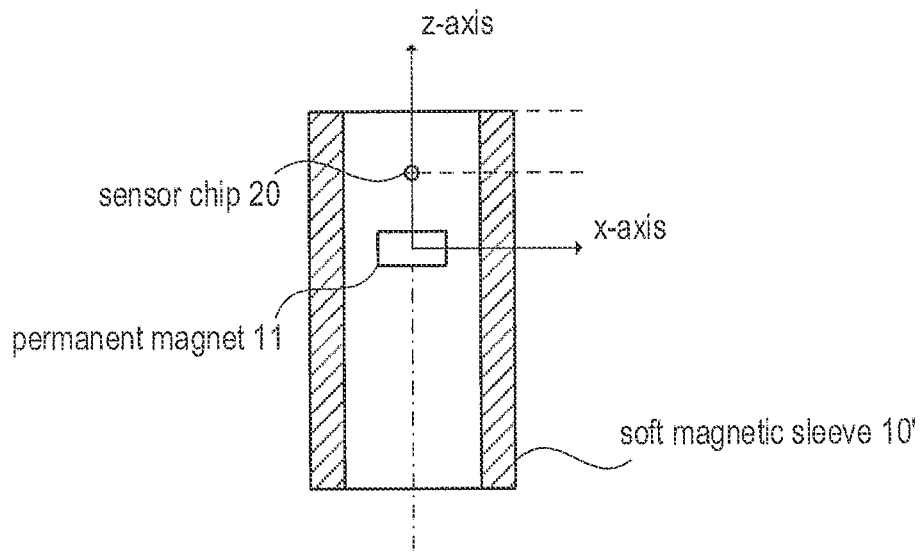
FIG. 2 is a schematic illustration of a rotary encoder including a ferromagnetic shield for shielding the magnetic field sensor from external magnetic fields.

As in the general example of FIG. 1, the magnetic field sensor shown in FIG. 2 is attached to a stator that does not perform an angular motion with regard to the rotation axis. The sleeve 10' is long enough (in an axial (z-) direction) that the permanent magnet 11 and the sensor chip 20 are fully accommodated in the interior of the sleeve (i.e. in the hollow space formed by the bore of the sleeve). Generally, the strength of the magnetic field H caused by a diametrically magnetized (e.g. in y-direction) permanent magnet of cylindrical shape and without a centric bore depends on its size. If the width (in x- or y- direction) of the magnet 11 is as large as the inner diameter of the sleeve 10', the sleeve 10' would form a magnetic short-circuit for the magnetic field H of permanent magnet 11 so that the resulting field strengths at the position of the sensor chip 20 would be almost zero. If the width of the permanent magnet 11 is small as compared to the inner diameter of the sleeve 10', the resulting field strengths at the position of the sensor chip 20 is also small. Furthermore, a small magnet would generate a rather inhomogeneous magnetic field, which would result in measurement errors. Accordingly, a medium width (e.g. between 30 and 70 percent of the inner diameter of the sleeve 10') of the permanent magnet 11 should be chosen as an optimum size. In a practical example, the width of the permanent magnet has been chosen to be 5 mm for a sleeve with an inner diameter of 12 mm. However, the larger the size of the permanent magnet 11, the better the homogeneity of the magnetic field on the sensor elements and this reduces angle errors caused by imprecise placement of the magnet 11 and the sensor chip 20 due to unavoidable production tolerances. When using permanent magnets with a very strong remanent magnetization (e.g. neodymium magnets with a remanent magnetization of 1 tesla), the width of the magnet 11 can be chosen between 70 and 90 percent of the inner diameter of the sleeve 10' (e.g. a width of 10 mm for an inner diameter of 12 mm) to reduce the influence of production tolerances while still having large enough fields on the sensor elements.

Figure 3:
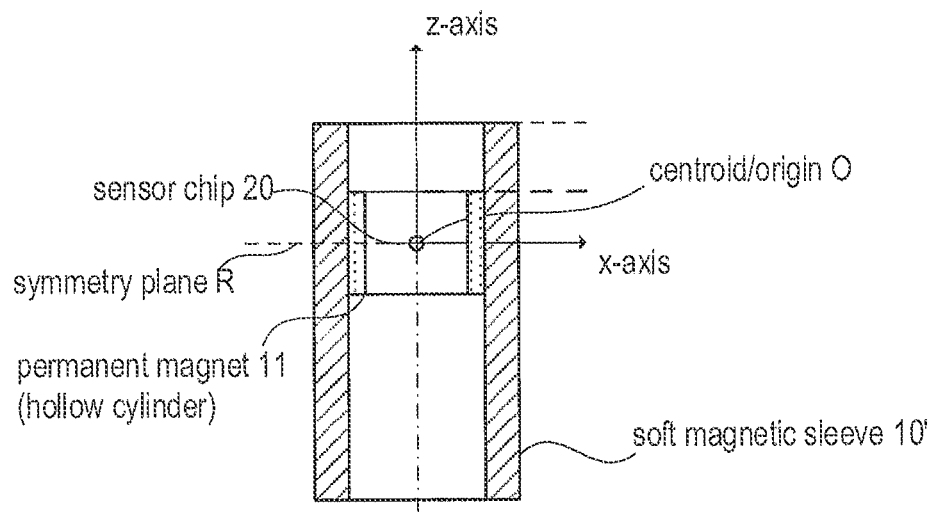
FIG. 3 illustrates one embodiment of a shielded rotary encoder, in which the magnetic field sensor is placed in the magnetic center of the permanent magnet.

FIG. 3 illustrates one exemplary embodiment of a rotary encoder which is composed of a magnetic set-up (e.g. the permanent magnet 11 and sleeve 10' in the example of FIG. 3) and a magnetic field sensor (sensor chip 20), which is placed in the magnetic center of the permanent magnet. The magnetic set-up is mechanically coupled to the rotating shaft whose angular position or velocity is to be measured. In most practical implementations the magnetic center will be identical to the geometric center of permanent magnet 11. When the permanent magnet is made of a homogeneous material, the geometric center is also identical with the center of mass of the permanent magnet (sometimes referred to as barycenter). In the following the term centroid is used, wherein in most practical cases there is no relevant difference between magnetic center, geometric center of the permanent magnet(s) and its (their) center of mass.

As a consequence, sensor chip 20 is placed in the origin of a Cartesian coordinate system, in which one axis (in the present example of FIG. 3 the z-axis) is in the rotation axis of the magnetic set-up and the two other axes (e.g. x-axis and y-axis) define a symmetry plane R of permanent magnet 11. In this coordinate system the centroid has the coordinates (0, 0, 0). In order to provide access to the centroid O of the magnetic set-up, the permanent magnet 11 includes a through-hole extending along the rotation axis to form a hollow space, in which the sensor chip 20 can be accommodated. In other words, the permanent magnet fully extends around the rotation axis (surrounding the hollow space). In the present example, permanent magnet 11 has the geometric form of a hollow cylinder (similar sleeve 10').

However, other geometries, which have a through-hole along the rotation axis, are applicable. The magnetization M of permanent magnet is (as in the previous examples) in a lateral (i.e. diametrical) direction, e.g. in the direction defined by the y-axis. The orientation of the magnetization of the permanent magnet 11 rotates with the shaft 10 (not shown in FIG. 3).

The sensor chip 20 is placed at the rotation axis in the middle of the (cylindrical) permanent magnet 11 as shown in FIG. 3. However, due to the high magnetic permeability of sleeve 10' it is not imperative to ensure that sleeve 10' (which also acts as a flux guide (back iron) for permanent magnet 11) is also symmetrically arranged with respect to symmetry plane R. This is true as long as the symmetry of the magnetic field lines of permanent magnet 11 is not significantly deteriorated by an asymmetric placement of sleeve 10'.

Investigations have shown that even comparable weak permanent magnets made of, for example, hard ferrite with a remanent magnetization of 0.22 tesla may generate a sufficiently high magnetic flux of, e.g., 40 millitesla at the centroid O. Generally, the magnetic center, in which sensor chip 20 is placed, is a point with a high symmetry with regard to the magnetic field and thus, the sensitivity of the rotary encoder with regard to unavoidable production tolerances is low.

Figure 4:
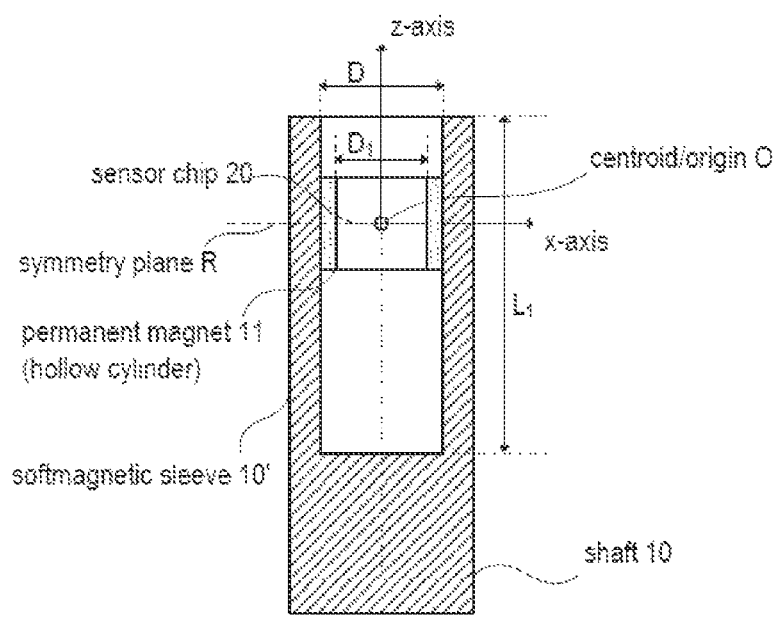
FIG. 4 illustrates another second embodiment of a shielded rotary encoder, in which the ferromagnetic shield is formed by the rotating shaft itself.

FIG. 4 illustrates another embodiment of an rotary encoder. FIG. 4 is essentially identical with FIG. 3 except that shaft 10 and sleeve 10' are one integral component, and the sleeve or the shaft has no through-hole. Accordingly, the sleeve 10' is formed by forming a cavity 15 in the shaft 10, for example, by boring a hole (stud-hole) along the rotation axis into a front face of shaft 10. Alternatively, the whole shaft 10 may be hollow (e.g. a through-hole is formed in shaft 10 along its rotation axis); in this case the sleeve 10' is formed by an end section of shaft 10. The permanent magnet 11, which also has the shape of a hollow cylinder, may be fitted in the sleeve 10', for example, by gluing, by using a press-fit or other joining techniques. In one practical implementation the inner diameter D of sleeve 10' (i.e. the inner diameter of cavity 15 formed in shaft 10 in the example if FIG. 4) is 12 mm. The outer diameter of permanent magnet 11 is therefore also approximately 12 mm, whereas its axial length $L_1$ is 10 mm and its inner diameter $D_1$ is also 10 mm. Choosing a magnetic material with a remanent magnetization of 350 mT results in a magnetic flux of 40 mT at the centroid O of the set-up. Due to the high symmetry of the magnetic field in the centroid O, where sensor chip 20 is located, the measurement errors are comparably low for given productions and assembly tolerances. Additionally, a non-magnetic spacer may be inserted into the stud-hole (cavity 15), before inserting the permanent magnet. Such a spacer can be used to assure the correct and intended axial position of the permanent magnet. Such a spacer may have an outer diameter close to the diameter of the stud-hole with some channels on its outer surface along axial direction. This can be used to facilitate the application of a glue to fix the spacer and/or the magnet to the sleeve: if a well-defined amount of glue is applied to the end of the stud-hole and the spacer is inserted next, the spacer squeezes the glue up through its channels to reach its top surface, where it reaches the bottom surface of the ring-shaped permanent magnet, thereby fixing both, permanent magnet and spacer inside the stud-hole.

Figure 5:
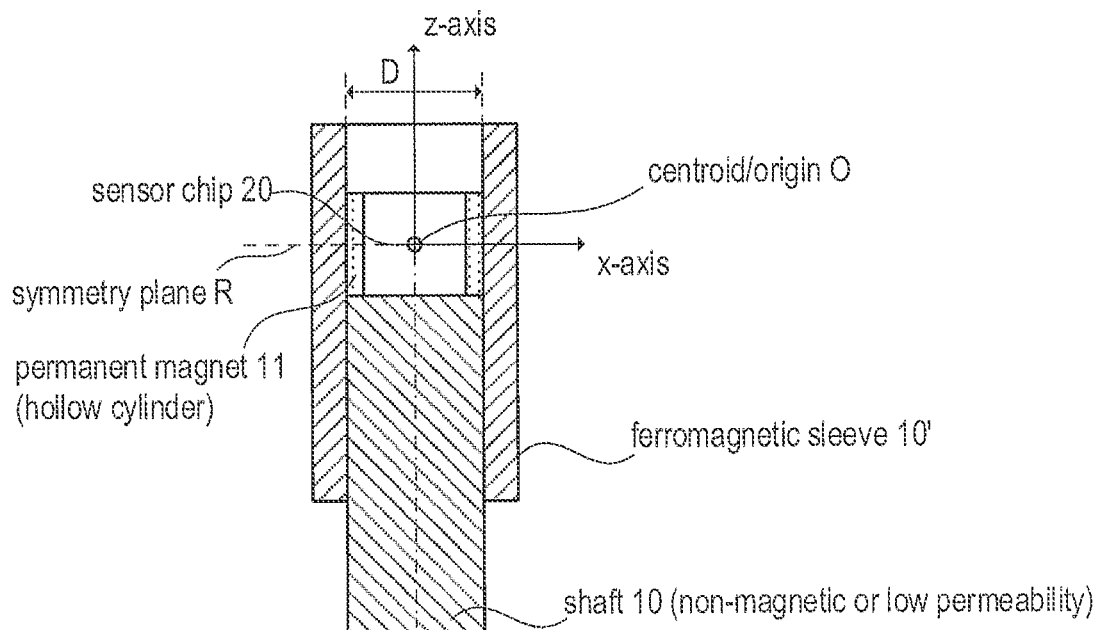
FIG. 5 illustrates a further embodiment of a shielded rotary encoder, in which the ferromagnetic shield is fitted on the rotating shaft.

For shafts 10 with a comparably small diameter, the inner diameter $D_1$ the permanent magnet may be too small to accommodate a sensor chip. In such cases sleeve 10' and shaft 10 may be separate components (see FIGS. 5 to 8), wherein the sleeve 10' is slipped over shaft 10 and mechanically coupled, e.g. using a press-fit or other suitable joining techniques. In the example illustrated in FIG. 5, permanent magnet 11 has the shape of a hollow cylinder and is inserted in sleeve 10' as in the previous example of FIG. 4. The inner diameter D of sleeve 10' and the outer diameter of permanent magnet 11 are approximately equal to form either a press fit, a medium fit or a loose fit dependent on which joining technique is used. In the example of FIG. 5, sleeve 10' is slipped over shaft 10 such that a front side of permanent magnet 11 adjoins a corresponding front side of shaft 10. The embodiment illustrated in FIG. 5 is particularly suitable for applications, in which shaft 10 is made of a non-magnetic material or a material with a relatively low (close to 1) relative magnetic permeability. However, in applications, in which shaft 10 is made of a soft magnetic steel (such as structural steel) the magnetic field of permanent magnet 11 will be distorted due to the close proximity between permanent magnet 11 and shaft 10. As a consequence of such distortion the magnetic center is no more coincident with the geometric center of permanent magnet 11 and the position of the sensor chip 20.

Figure 6:
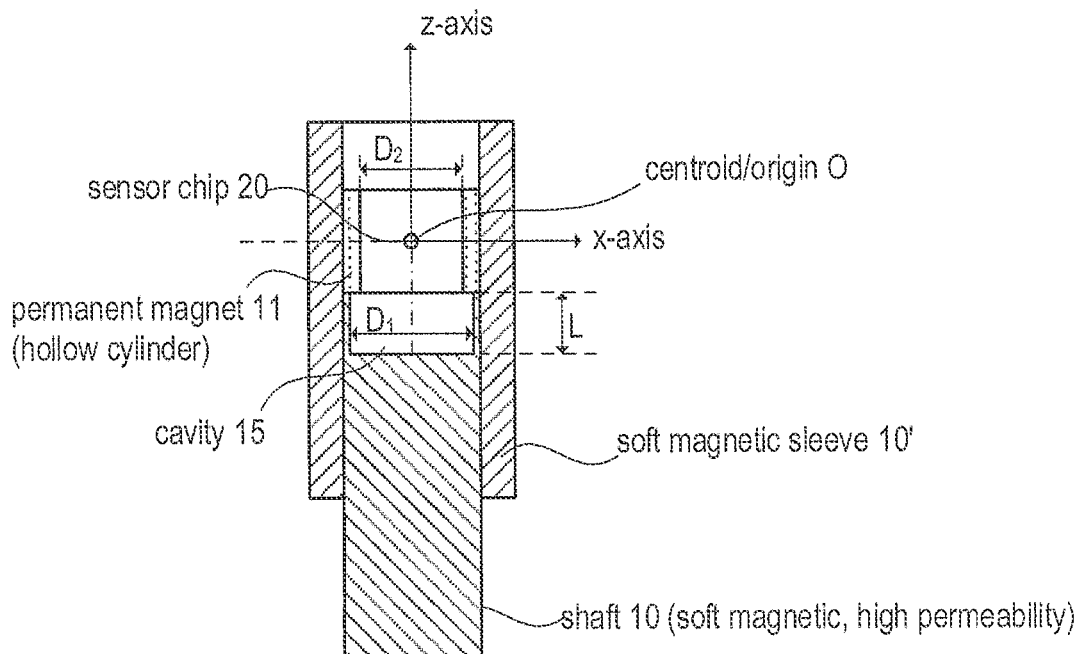
FIG. 6 illustrates an embodiment similar to the embodiment of FIG. 5, wherein the front side of the shaft facing the permanent magnet includes a cavity.

To further optimize the rotary encoder set-up for magnetic shafts, the embodiment of FIG. 5 is slightly modified (see FIG. 6). Accordingly, a cavity 15 is formed in the front side of shaft 10 so that cavity 15 adjoins permanent magnet 11 instead of the solid shaft as in the previous example. Cavity 15 may be formed by boring a hole into the front side of shaft 10 along the rotation axis, so that only a small portion of steel (i.e. the wall of cavity 15) remains along the circumference of shaft 10. In the present example the diameter $D_1$ of cavity 15 is larger than the inner diameter $D_2$ of permanent magnet 11, which results in a comparably thin walled end of the shaft, which may be difficult to produce. To simplify production the cavity formed in the shaft may have an inner diameter that is equal to or smaller than the inner diameter of the permanent magnet. However, the smaller the diameter of the cavity, the smaller is the beneficial effect of the cavity on the magnetic field at the centroid of the permanent magnet (i.e. at the position of sensor chip 20). A large diameter cavity will results in a point (in the geometric centroid of the permanent magnet) of good magnetic symmetry on the rotation axis. The axial size L of the cavity 15 should be preferably at least as large as half of the diameter $D_1$ of the cavity. Again here the rule applies that a small axial extension of the cavity gives a correspondingly small beneficial effect of the cavity on the symmetry of the magnetic field at the centroid of the permanent magnet. However, for an axial extension larger than two times the diameter $D_1$ a further increase of axial extension does not lead to significant improvements of symmetry in the magnetic field. Furthermore, the cavity may also have conical form, preferably with an aperture angle of less or equal 120°. Apart from cavity 15 the embodiment of FIG. 6 is identical to the previous embodiment of FIG. 5.

Figure 7:
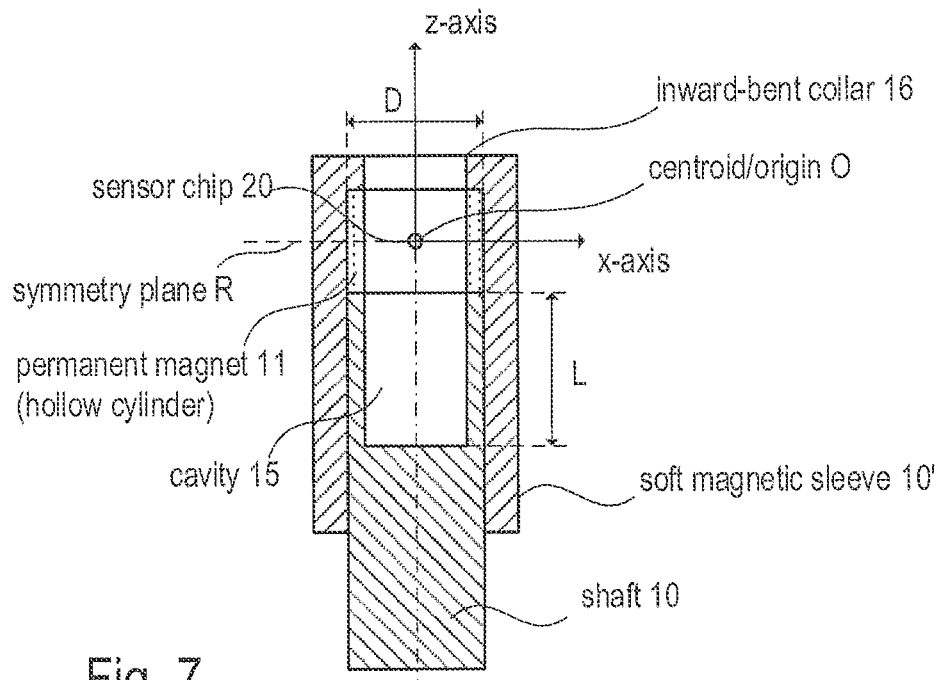
FIG. 7 illustrates an embodiment similar to the embodiment of FIG. 5, wherein the ferromagnetic shield has an inward-bent collar adjoining a front side of the permanent magnet.

Dependent on the actual application, further improvements may be achieved by modifying the embodiment of FIG. 6 as shown in FIG. 7. The example of FIG. 7 is essentially the same as the previous example of FIG. 6. However, the axial length L of cavity 15 is larger than the outer diameter D of permanent magnet 11. Furthermore, the outer end of sleeve 10' (i.e. the end of sleeve 10' not adjoining shaft 10) has an inward-bent collar 16, which may be produced, for example using a crimping tool. As a result, one front side of permanent magnet 11 is close to (or directly adjoins) a back side of collar 16 of the soft magnetic sleeve 10', which acts as a flux guide (back iron) similar to shaft 10.

Similarly, shaft 10 adjoins the opposing front side of permanent magnet 11. To ensure a high symmetry of the set-up the inner diameter of cavity 15 may be equal to the inner diameter of the inward-bent collar 16.

Figure 8:
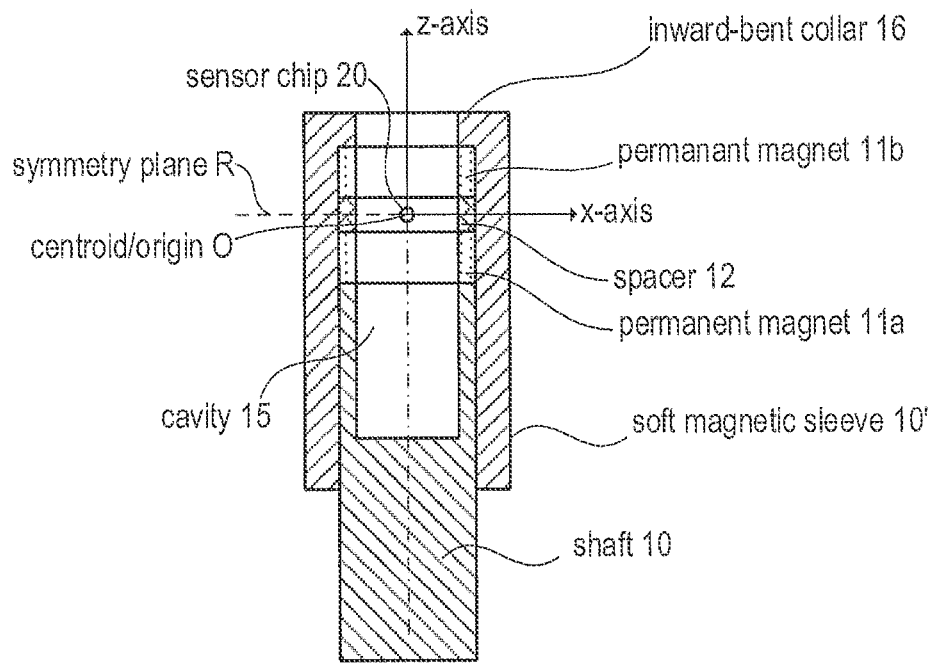
FIG. 8 illustrates another second embodiment of a shielded rotary encoder similar to the embodiment of FIG. 7, wherein the permanent magnet is replaced by an assembly including two axially spaced permanent magnets.

The example of FIG. 8 illustrates a minor modification of the previous example of FIG. 7. Different from FIG. 7, however, permanent magnet 11 is replaced by an assembly of two permanent magnets 11a and 11b, which are spaced apart by a spacer 12. Both permanent magnets 11a and 11b have the same shape as the permanent magnets 11 in the previous examples, i.e. the shape of a hollow cylinder. To ensure a symmetric set-up, permanent magnets 11a and 11b are identical in size, and sensor chip 20 is placed in the centroid, which is on the rotation axis between permanent magnet 11a and permanent magnet 11b. In this example, the magnetic center is the same as the geometric center of the permanent magnet arrangement, which includes permanent magnets 11a and 11b. Spacer 12 may be made of plastic (or any other non-magnetic material and having low permeability as compared to sleeve 10') and may also have the shape of a hollow cylinder with the same outer diameter as permanent magnets 11a and 11b. To allow an easy assembly, a front side of permanent magnet 11a may be glued to a corresponding front side of spacer 12 while permanent magnet 11b is glued to the opposing front side of spacer 12 in the same manner.

In case of a permanent magnet assembly including two (or more) permanent magnets it is important that the permanent magnets have a well-defined angular position relative to each other. In many applications it may be desired, for example, to align two permanent magnets such that the remanent magnetization of each permanent magnet points in the same direction (e.g. y-direction). That is, the magnets are aligned parallel to each other with regard to their magnetization, which means that north poles of one permanent magnet face north poles of the other permanent magnet and, therefore, the two magnets repel each other. However, in other applications it may be desirable to align the two permanent magnets such that the remanent magnetizations the two permanent magnets are oriented anti-parallel, which results in an attractive force between them. For this reason, it may be difficult to mechanically attach (e.g. by gluing) the permanent magnets to each other, and it may be important to provide some mechanical lock between both magnets that withstands the repelling or attracting forces between both permanent magnets at least during a certain time (e.g. while an adhesive cures). If the magnetization of both magnets is parallel, it is also possible to attach one to the other with a spacer in-between and magnetize them at the same time after they have been fixed to each other. This reduces the number of individual parts, facilitates handling, and improves the matching between the two permanent magnets, because they are magnetized simultaneously so that their magnetizations are well-aligned and of equal strength.

Replacing the permanent magnet by an assembly of two permanent magnets may reduce the sensitivity of the rotary encoder with regard to tolerances in the axial placement of the permanent magnet. However, when assembling the two permanent magnets 11a and 11b, care should be taken to avoid an angular misalignment of the two permanent magnets 11a and 11b. A proper alignment of the two permanent magnets 11a and 11b is provided by the embodiment illustrated in FIG. 9.

Figure 9:
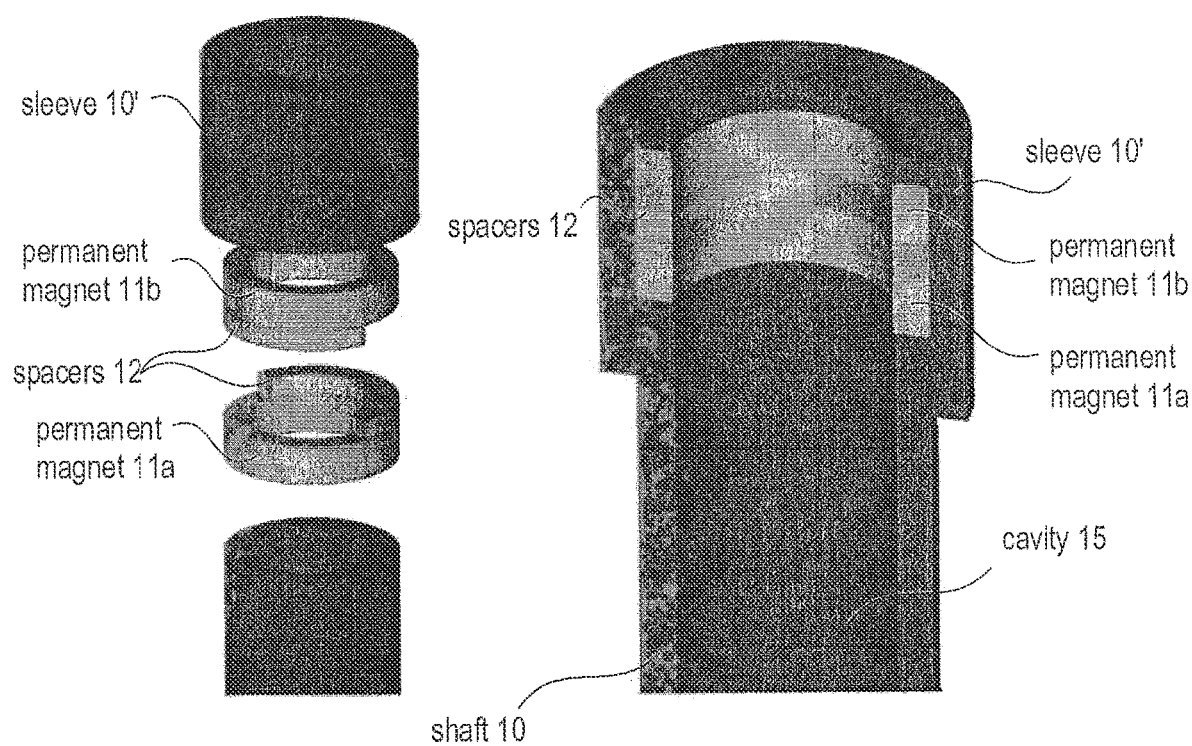
FIG. 9 illustrates an exploded view and the assembly of the rotary encoder of FIG. 8, wherein a split ring-shaped spacer is arranged between the two permanent magnets.

The left part of FIG. 9 is an exploded view of one example of a rotary encoder built in accordance with FIG. 8. The right part of FIG. 9 is a perspective cross-sectional view of the assembled rotary encoder. The present example is essentially the same as the previous example of FIG. 8. In the present example, however, spacer 12 has the form of a ring (a hollow cylinder, which has a height smaller than its inner diameter), e.g. made of plastic. However, the spacer is composed of two half-rings. That is, the ring is split in two pieces along its symmetry axis. One half-ring is attached to permanent magnet 11a, and the second half-ring is attached to permanent magnet 11b, e.g. by gluing or injection molding of the half-ring directly onto the permanent magnets. When assembling the rotary encoder, the relative angular position of permanent magnets 11a and 11b is determined by the two half rings, which complement one another to form one ring-shaped spacer. The remaining components shown in FIG. 9 are identical to the previous example of FIG. 8.

Although the disclosure has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the disclosure.

For example, the permanent magnet(s) used in the embodiments described above have the shape of a hollow cylinder. However, any other hollow axially symmetric (rotation-symmetric) shape may be applicable instead of the mentioned hollow cylinder. For example, in a further embodiment a permanent magnet assembly may include two spherical half-shells of permanent magnetic material arranged symmetrically to the rotation axis and having a through-hole along the rotation axis. The two half-shells may be arranged spaced apart from each other by a ring-shaped spacer, e.g. as shown in FIGS. 8 and 9. Further exemplary geometries for the permanent magnet(s) are (truncated) cone and double cone, ellipsoidal half-shells, etc., each having a hole along the rotation axis. Moreover, more than two permanent magnets may be used in one permanent magnet assembly.

Furthermore, in the examples described above, the permanent magnet(s) is (are) magnetized in a lateral direction (i.e. in a direction perpendicular to the rotation axis, e.g. the y-axis). However, other geometries may be applicable. Instead of a homogeneous magnetization along the y-axis, the permanent magnet may be magnetized to form an axial quadrupole. In this case, one half of the permanent magnet (e.g. left of the plane defined by y=0) is magnetized parallel to the z-axis (rotation axis), and the other half (e.g. right of the plane defined by y=0) is magnetized anti-parallel to the z-axis.

In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A rotary encoder comprising:
   a permanent magnet arrangement including at least one permanent magnet, which is rotatable with respect to a rotation axis;
   a soft magnetic sleeve encompassing the rotation axis and thus the permanent magnet arrangement for shielding against external magnetic fields; and
   a shaft comprising a single unitary structure, which is rotatable with respect to the rotation axis and mechanically coupled to the permanent magnet arrangement to ensure a common rotation;
   wherein the soft magnetic sleeve is formed by a cavity arranged in the shaft, the cavity extending, along the rotation axis, into the shaft from a front side of the shaft such that there is no through-hole in the shaft.

2. The rotary encoder of claim 1, further comprising a magnetic field sensor to measure a magnetic field associated with the permanent magnet arrangement.

3. The rotary encoder of claim 2, wherein the at least one permanent magnet includes a through-hole, which extends along the rotation axis, so that the at least one permanent magnet fully extends around the rotation axis.

4. The rotary encoder of claim 3, wherein the magnetic field sensor is located within the through-hole of the permanent magnet on the rotation axis.

5. The rotary encoder of claim 4, wherein the permanent magnet arrangement has a centroid that is located within the through-hole at the rotation axis, and wherein the magnetic field sensor is located in the centroid.

6. The rotary encoder of claim 1, wherein the at least one permanent magnet is substantially rotationally symmetric with respect to the rotation axis.

7. The rotary encoder of claim 1, wherein the permanent magnet arrangement is substantially symmetric with respect to a symmetry plane, to which the rotation axis is perpendicular.

8. A rotary encoder comprising:
   a permanent magnet arrangement including at least one permanent magnet, which is rotatable with respect to a rotation axis and includes a through-hole, which extends along the rotation axis, so that the at least one permanent magnet fully extends around the rotation axis;
   a soft magnetic sleeve encompassing the rotation axis and thus the permanent magnet arrangement for shielding external magnetic fields;
   a shaft comprising a single unitary structure, which is rotatable with respect to the rotation axis and mechanically coupled to the permanent magnet arrangement to ensure a common rotation, and
   a magnetic field sensor located within the through-hole on the rotation axis to measure a magnetic field associated with the permanent magnet arrangement,
   wherein the soft magnetic sleeve is formed by a cavity arranged in the shaft, the cavity extending, along the rotation axis, into the shaft from a front side of the shaft such that there is no through-hole in the shaft.

9. The rotary encoder of claim 8, wherein the permanent magnet arrangement has a centroid that is located within the through-hole, and wherein the magnetic field sensor is located in the centroid.

10. The rotary encoder of claim 8, wherein the at least one permanent magnet is substantially rotationally symmetric with respect to the rotation axis.

11. The rotary encoder of claim 8, wherein the permanent magnet arrangement is substantially symmetric with respect to a symmetry plane, to which the rotation axis is perpendicular.

12. The rotary encoder of claim 8, wherein the magnetic field sensor includes one or more sensor elements included in one chip package.

13. The rotary encoder of claim 2, wherein the permanent magnet arrangement has a centroid that is located within the through-hole of the permanent magnet, and wherein the magnetic field sensor is located in the centroid.

14. The rotary encoder of claim 2, wherein the magnetic field sensor includes one or more sensor elements included in one chip package.

* * * * *